United States Patent [19]

Naruki

[11] 4,450,495

[45] May 22, 1984

[54] PORTABLE ACOUSTIC DEVICE

[75] Inventor: Toshimasa Naruki, Fukushima, Japan

[73] Assignee: Mitsubishi Denki Kabushiki Kaisha, Tokyo, Japan

[21] Appl. No.: 309,754

[22] Filed: Oct. 8, 1981

[30] Foreign Application Priority Data

| Oct. 9, 1980 | [JP] | Japan | 55-141550 |
| Oct. 9, 1980 | [JP] | Japan | 55-141551 |
| Oct. 9, 1980 | [JP] | Japan | 55-144098 |
| Oct. 9, 1980 | [JP] | Japan | 55-144099 |
| Oct. 9, 1980 | [JP] | Japan | 55-144100 |
| Oct. 9, 1980 | [JP] | Japan | 55-144101 |
| Oct. 9, 1980 | [JP] | Japan | 55-144102 |
| Feb. 9, 1981 | [JP] | Japan | 56-16920[U] |
| Feb. 9, 1981 | [JP] | Japan | 56-16921[U] |
| Feb. 9, 1981 | [JP] | Japan | 56-16922[U] |
| Feb. 9, 1981 | [JP] | Japan | 56-16923[U] |
| Feb. 9, 1981 | [JP] | Japan | 56-16924[U] |
| Feb. 9, 1981 | [JP] | Japan | 56-16925[U] |
| Feb. 9, 1981 | [JP] | Japan | 56-16926[U] |
| Feb. 9, 1981 | [JP] | Japan | 56-16927[U] |
| Feb. 9, 1981 | [JP] | Japan | 56-16928[U] |

[51] Int. Cl.³ .............................................. G11B 5/02
[52] U.S. Cl. ..................................... 360/137; 455/89; 455/350; 339/152
[58] Field of Search .................. 360/137; 455/89, 100, 455/351, 347-350; 339/152

[56] References Cited

U.S. PATENT DOCUMENTS 3,728,664  4/1973  Hurst .................................... 455/89
3,943,564  3/1976  Tushinsky ........................... 360/137
3,983,483  9/1976  Pando ................................... 455/89

Primary Examiner—John H. Wolff
Attorney, Agent, or Firm—Sughrue, Mion, Zinn, Macpeak & Seas

[57] ABSTRACT

A portable stereo system includes a body unit having a tape player and a hinge portion and loudspeaker units having matching hinge portions. The player and loudspeakers can be coupled by a hollow hinge shaft which doubles as a battery holder, and the entire flexible assembly can be fastened around the user's waist or slung across his shoulder by a belt which is detachably fastened to at least the loudspeaker units. If desired, the loudspeakers can be omitted and the belt coupled directly to the hinge shafts.

27 Claims, 23 Drawing Figures

PORTABLE ACOUSTIC DEVICE

BACKGROUND OF THE INVENTION

1. Field of the Invention

This invention relates to portable acoustic devices such as stereo radio sets, micro-cassette tape recorders, sound record and reproduction devices or reproduction-only devices or sound amplifiers for small tape recorders, and cassette tape recorders with radio sets, all of which are carried by the users.

2. Description of the Prior Art

In a conventional stereo radio and cassette tape recorder, as shown in FIG. 1 a magnetic tape cassette running mechanism 1, a pair of loudspeakers 2 provided on either side of the mechanism 1 and a radio receiver 3 are incorporated in one cabinet 4. Batteries 5 as the power source are placed in the cabinet 4. The batteries 5 can be replaced by opening the rear cover.

Such a conventional stereo cassette tape recorder can be carried with either the handle or in a carrying case (not shown) hung from the shoulder.

One example of the stereo radio and cassette tape recorder of this type is JR-770 FM/AM stereo radio and cassette tape recorder which has been previously sold by the Mitsubishi Denki Kabushiki Kaisha (Mitsubishi Electric Co., Ltd.) who is the assignee of the present application.

Such a conventional stereo radio and cassette tape recorder will now be described in general, with the detailed description of the internal arrangement of the cassette tape desk, the electric control circuit, the radio receiver's circuit, the stereo amplifier circuit, etc. omitted.

Since the performance of these tape recorders has been remarkably improved, they are used outdoors for a variety of purposes, and accordingly it has therefore become desirable to improve the tone quality and to increase the output power. Such tape recorders are frequently taken on leisure activities such as hiking or cycling or to photography meetings or live sound recording meetings. However, it is often incovenient to take the tape recorder, which is constructed as shown in FIG. 1, especially for an activity such as cycling. More specifically, since the tape recorder is heavy, it is difficult to carry the tape recorder for a long time. Furthermore, it is impossible for the user to carry the tape recorder with him at all times when his hands are otherwise occupied, such as in a photography meeting or the like.

SUMMARY OF THE INVENTION

Accordingly, a first object of this invention is to eliminate the above-described drawbacks accompanying a conventional portable acoustic device, and more specifically to provide a portable acoustic device such as a cassette tape recorder or a microcassette tape recorder which the user can readily carry with him.

A second object of this invention is to provide a compact portable acoustic device, the invention featuring an arrangement in which a loudspeaker unit provided on the right or left side of a body unit is turnable about a turning shaft with respect to the body unit, and the turning shaft is used to receive the power source, namely, batteries.

A further feature of this invention is the provision of a portable acoustic device in which two loudspeaker units are provided on either side of a body unit, respectively, in such a manner that the loudspeaker units are turnable with respect to the body unit, and belts are fastened to the outer sides of the respective loudspeaker units.

A further feature of this invention is the provision of a portable acoustic device in which two loudspeaker units are provided on either side of a body unit, respectively, in such a manner that the loudspeaker units are turnable about turning shafts with respect to the body unit, and the loudspeaker units can be separated from the body unit by removing the turning shafts.

A still further feature of this invention is the provision of a portable acoustic device for reproducing sound recorded in a magnetic tape, which comprises; a body unit for reproducing sound recorded in a magnetic tape; two loudspeaker units arranged respectively on either side of the body unit, the two loudspeaker units being separable from the body unit; a first hollow hinge part and a second hinge part which are provided respectively between the sides of the body unit and each loudspeaker unit where the body unit is engaged with each loudspeaker unit, the first and second hollow hinge parts having cylindrical inner walls which are substantially equal in diameter, the first and second hollow hinge parts being so positioned that the first and second hinge parts can be joined as one hinge; two hinge shafts inserted into the first and second hollow hinge parts respectively on either side of the body unit in such a manner that the loudspeaker units are turnable about the respective hinge shafts; and a belt fastened to the body unit and two loudspeaker units by being inserted into belt mounting parts which are formed on the rear surfaces of the body unit and two loudspeaker units, the body unit, two loudspeaker units and belt being separable from one another.

BRIEF DESCRIPTION OF THE DRAWINGS

The foregoing objects and other objects of the invention will become more apparent from the following detailed description and the appended claims when read in conjunction with the accompanying drawings, in which:

FIGS. 4 and 5 are diagrams showing a second example of the portable acoustic device according to the invention. More specifically, FIG. 5 is an external view of the second example of the portable acousting device according to the invention, corresponding to FIG. 2;

FIG. 6 is an exploded perspective view of the portable acoustic device, FIG. 7 is an external view of the same, and FIG. 8 is an explanatory diagram showing the rear surface of the portable acoustic device.

DETAILED DESCRIPTION OF THE PREFERRED EMBODIMENTS

This invention will now be described with reference to a cassette tape recorder with a radio set by way of example.

Figure 1:
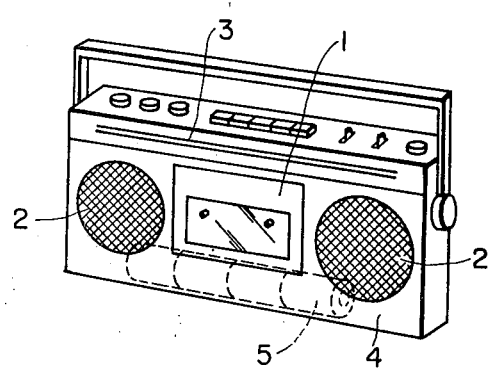
FIG. 1 is an external view of a conventional cassette tape recorder with a radio set.
Figure 2:
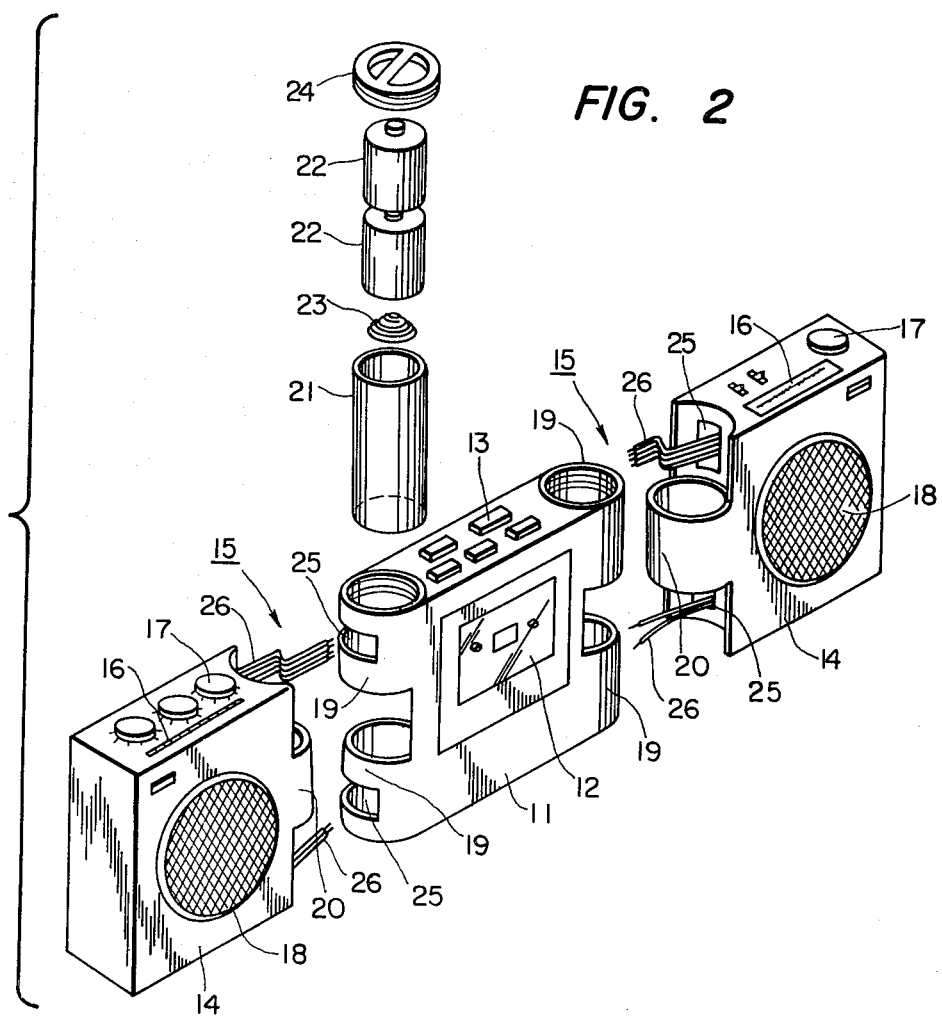
FIG. 2 is an exploded view of a first example of a portable acoustic device, namely a stereo tape recorder according to this invention.

In a first example of a portable acoustic device according to the invention, as shown in FIG. 2, the right and left loudspeaker units are engaged with a body unit including a cassette running mechanism in such a manner that the loudspeaker units are turnable about supporting sections with respect to the body unit, and the supporting sections are further adapted to hold power supply batteries. Therefore, the portable acoustic device is compact, high in performance and high in output power.

In FIG. 2, reference numeral 11 designates a body unit having a magnetic tape cassette running mechanism 12 in which a control circuit for controlling the cassette, an amplifier, etc. are provided; 13, operating buttons, namely, recording, fast forwarding, play back, rewinding and stopping buttons for the cassette running mechanism 12; and 14 and 14, a pair of loudspeaker units which are coupled through supporting sections 15 to the right and left sides of the body unit 11 in such a manner that they are swingable forwardly and backwardly, each loudspeaker unit 14 having (FM or AM) radio receiver 16, a sound control knob 17 and a loudspeaker 18. The casings of the body unit 11 and the loudspeaker units 14 and 14 are made of electrically insulating plastic material.

Each of the supporting sections 15 comprises: upper and lower cylinder hinge parts 19 which are integral with the body unit 11; a cylindrical hinge part 20 which is integral with the respective loudspeaker unit 14 and is inserted between the upper and lower cylindrical hinge parts 19; and a hollow shaft 21 which is inserted into the hinges parts 19 and 20 so that the loudspeaker unit is coupled to the body unit 11. The hollow shaft 21 also serves as a battery holder. That is, batteries 22 and a negative contact piece 23 are inserted into the hollow shaft 21, and the shaft 21 is then covered with a battery cover 24 which is also used as a positive contact piece. The use of hollow shaft 21, both as a hinge pin and as a battery holder, reduces the number of parts in the portable acoustic device, thereby decreasing the cost of its manufacture. Furthermore, as is apparent from FIG. 2, the dual use of the hollow shaft 21 allows a design which provides a large sturdy hinge with no size requirements over those of the battery 22, which are necessarily included anyway. This reduction in size is of great importance for a portable acoustic device. Insertion holes 25 for wiring are cut in the joining surfaces of the body unit 11 and each of the loudspeaker units 14, i.e. in the hinge parts 19 and the wall of the loudspeaker unit 14 which is in contact with the hinge parts 19. The loudspeaker units 14 are electrically connected to the body unit 11 through flat cables or vinyl-covered wires 26 extended through the insertion holes 25.

The portable acoustic device shown in FIG. 2 is assembled as follows: First, the loudspeaker units 14 are electrically coupled to the body unit 11 through the wires 26 extended through the insertion holes 25. Then, the hinge part 20 of each loudspeaker unit 14 is inserted between the upper and lower hinge parts 19 on each side of the body unit 11. Thereafter, the hollow shaft 21 is inserted into the hinge parts 19 and 20 while keeping the wires 26 aside. The negative contact piece 23 and the batteries 22 are inserted into the hollow shaft 21 and then the latter 21 is covered with the battery cover 24, on each side of the body unit 11. With the portable acoustic device assembled as described above, each loudspeaker unit 14 can be swung forwardly and backwardly about its respective supporting section 15 with respect to the body unit 11. The swinging operation of each loudspeaker unit 14 will not be obstructed by the wires 26.

Figure 3A:
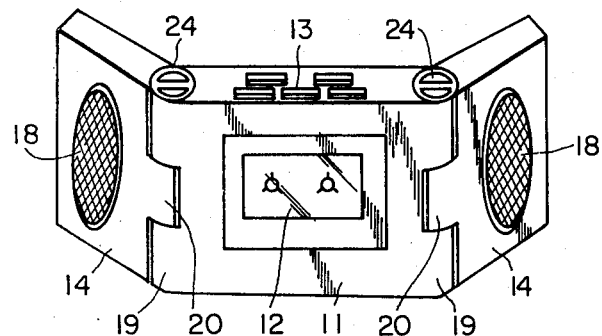
FIGS. 3A and 3B are perspective views showing two states of use of the portable acoustic device shown in FIG. 2.
Figure 3B:
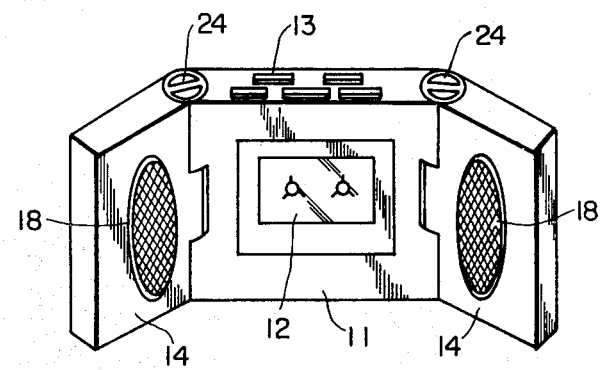

FIGS. 3A and 3B show the portable acoustic device with the loudspeaker units 14 and 14 swung forwardly and backwardly, respectively. In FIGS. 3A and 3B, some components are not shown for the sake of simplicity. In the case where the loudspeaker units 14 are swung as shown in FIG. 3A, sufficient stereophonic effect can be obtianed although the loudspeaker units 14 are relatively close to each other. This is also the case where the loudspeaker units 14 are swung as shown in FIG. 3B.

As is apparent from the above description, according to the first example of the portable acoustic device of this invention, a radio set with a cassette tape recorder can be made small in size and high in performance, being easily portable while still achieving satisfactory stereophonic effects. If large capacity dry cells are inserted in the supporting sections between the body unit and the loudspeaker units, then the output power can be increased. Another feature of the first example of the portable acoustic device is that the wires connecting the loudspeaker units to the body unit are laid by utilizing the spaces of the supporting sections.

A second example of the portable acoustic device according to this invention will be described with reference to FIGS. 4 and 5.

Figure 4A:
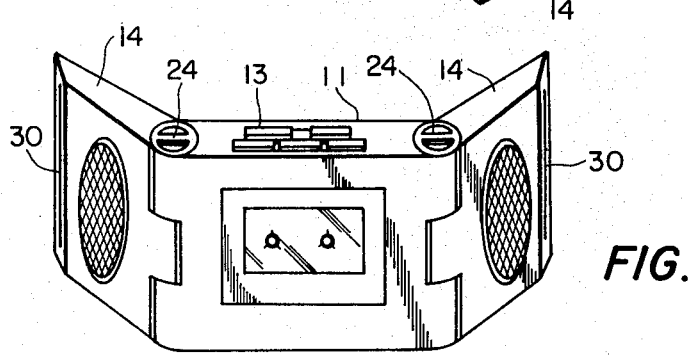
FIGS. 4A and 4B are perspective views showing two states of use of the portable acoustic device, corresponding to FIGS. 3A and 3B.
Figure 4B:
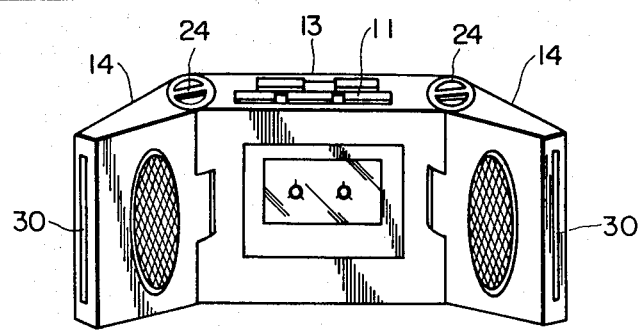
Figure 5:
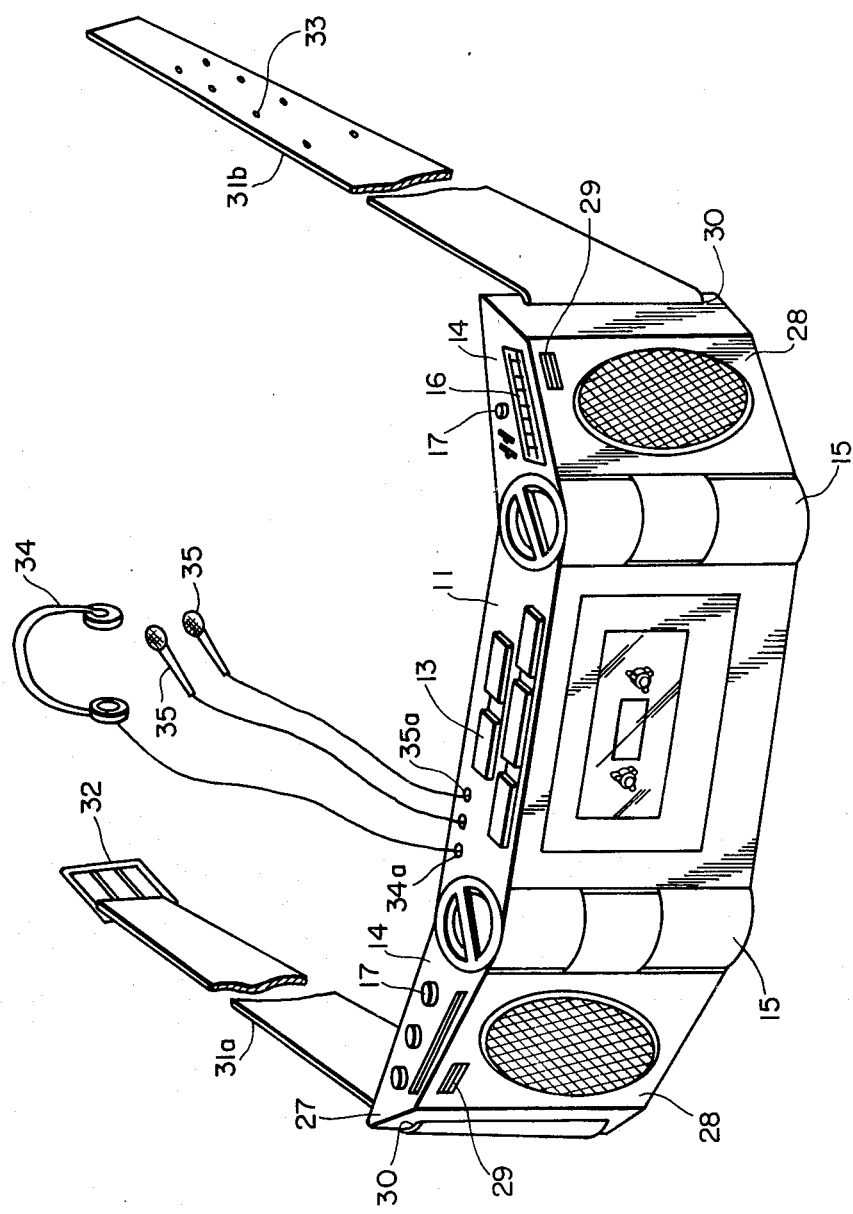

The second example is substantially similar to the first example except for openings 30 which are formed in the outer sides of loudspeaker units 14 and 14 to fasten first end portions of belts 31a and 31b forming a belt assembly 30, respectively, as shown in FIG. 5. FIGS. 4A and 4B correspond to FIGS. 3A and 3B, showing states of use of the portable acoustic device shown in FIG. 5. In FIGS. 5 and 2, like parts are designated by like reference numerals.

The belts 31a and 31b are detachably fastened to the outer sides of the loudspeaker units 14 and 14. More specifically, the first end portions of the belts 31a and 31b are inserted into the openings 30 formed in the outer sides of the loudspeaker units 14 and 14 and are then rotatably fastened to the bars which are formed in the outer sides of the loud-speaker units due to the openings 30. The outer end portion of the belt 31a is fastened to a metal buckle 32. The other end portion of the belt 31b has small holes into which the bars of the metal buckle 32 are inserted.

Each of the right and left loudspeaker units 14 and 14 is so shaped that the thickness is gradually decreased towards the outer side 27 as is apparent from FIGS. 4 and 5. Condenser microphones 29 and 29 are embedded in the front surfaces 28 and 28 of the loudspeaker units 14 and 14, respectively.

In FIG. 5, reference numerals 34 and 34a designate a head-phone and its jack, respectively, and 35 and 35a designate a recording microphone and its jack, respectively.

The belts 31a and 31b fastened to the outer sides 27 of the loudspeaker units 14 may be replaced by a relatively long belt which is so designed that one end portion of the belt is fastened to the outer side 27 of one of the loudspeaker units 14 in advance, and the other end portion is detachably fastened to the outer side 27 of the other loudspeaker unit 14. This long belt is more convenient when the portable acoustic device is fixedly set on the user's belly, because the user can handle the belt on the side of his waist. The above-described belts may include rubber bands.

The user can operate the above-described portable acoustic device while walking or can carry it with him by fastening it to his belly with the belts 31a and 31b. In this case, the two loudspeaker units 14 and 14 are turned along the curve of his belly as the belts are tightened, and therefore the device is snugly and tightly fitted to his belly.

Therefore, in the case of the second example of the stereo cassette tape recorder equipped with radio sets, the user can freely use his hands while carrying the device with him. Furthermore, as the device is tightly fixed to his body, it will never come off his body even when the device is somewhat vibrated while he is walking. Thus, the user can lightly carry the device with him.

In the second example described above, the two loudspeaker units are pivotally coupled to the central stereo cassette tape recorder, so that the loudspeaker units are turned wide open about the hinge means. In addition, the thickness of each loudspeaker unit is gradually decreased towards its outer side. Therefore, the device can be fixed to the user's belly in such a manner that the loudspeaker units are directed outwardly. Therefore, in the case of stereo reproduction, the sound field is spread sufficiently; so that an excellent stereo reproduction acoustic effect can be given to a third person. Furthermore, as the microphones 29 are set in the loudspeaker unit surfaces as described above, a wide range of sound can be recorded in the stereophonic recording operation. Thus, the device performs very will as a tape recorder while being carried by the user.

While the invention has been described with reference to the stereo cassette tape recorder with radio sets, the invention is not limited thereto or thereby. That is, the technical concept of the invention may be applied to a stereo or monaural cassette tape recorder having not radio set. Furthermore, the radio set 16 may be provided in one of the loudspeaker units 14, or the radio set or sets 16 may be provided in the body unit 11. Thus, the term "tape recorder" as herein used is intended to mean a stereo or monaural tape recorder or such a tape recorder with a radio set or radio sets.

Figure 6:
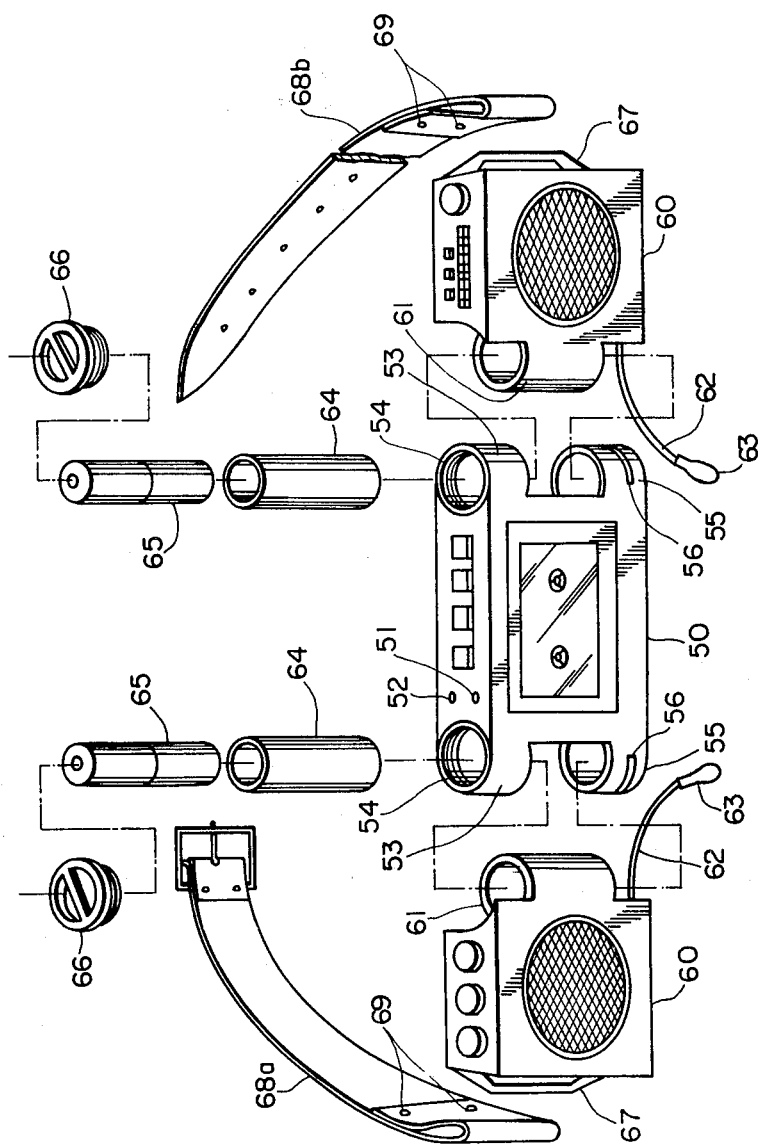
FIGS. 6 through 8 are diagrams showing a third example of the portable acoustic device according to the invention. More specifically.

A third example of the portable acoustic device according to the invention will be described with reference to FIGS. 6 through 8 which show a cassette tape recorder by way of example. FIG. 6 is an exploded view of the tape recorder, FIG. 7 is a front view of the assembled tape recorder, and FIG. 8 is a rear view of the assembled tape recorder.

Figure 7:
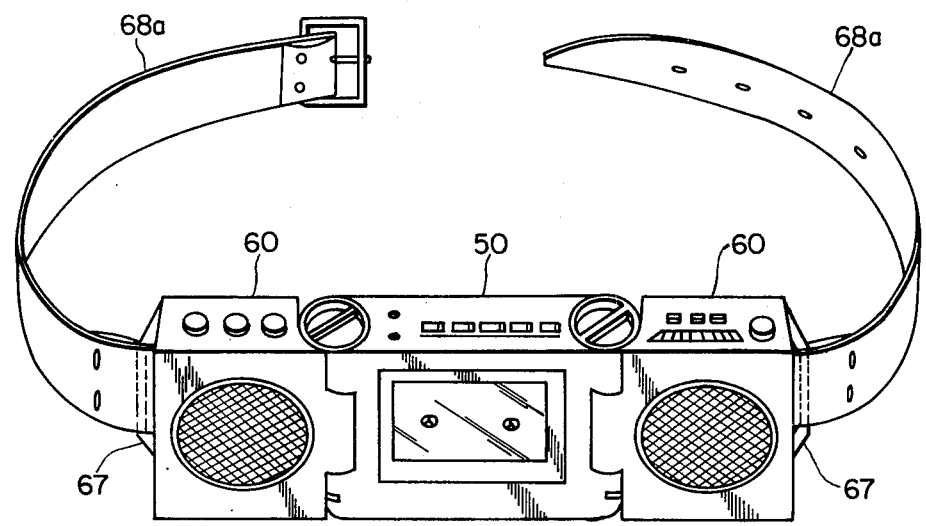
Figure 8:
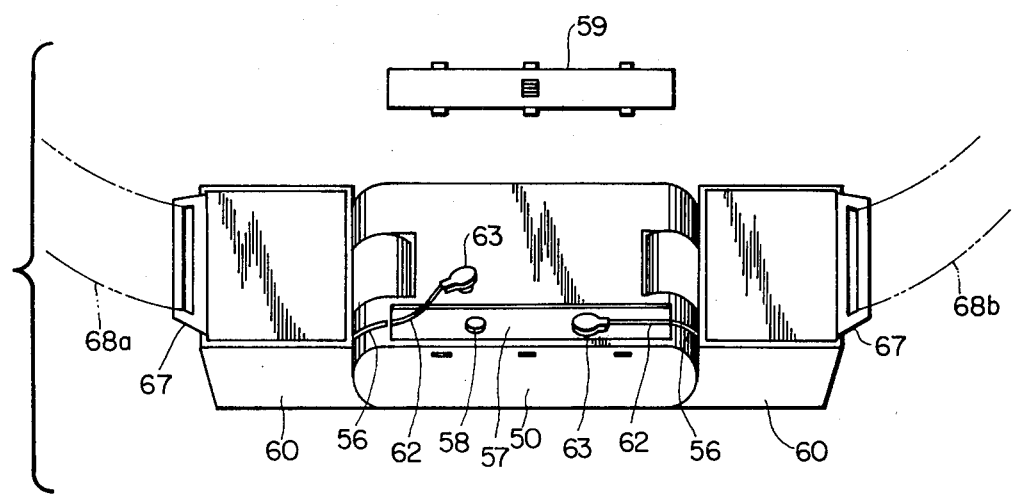

In FIGS. 6 through 8, reference numeral 50 designates the body unit of the cassette tape recorder; 51, a microphone jack; 52, a head-phone jack; 53, hinge parts; 54, threads through which power source terminals are connected; 55, hinge parts in the inner surfaces of which protrusions (not shown) to be connected to the power source terminals are formed; 57, a connector receiver chamber with communicating slits 56; 58, a connector receiver; 59, a cover; 60, loudspeaker units; 61, hinge parts; 62, cords; 63, connectors; 64, hollow, cylindrical hinge shafts; 65, batteries; 66, battery covers; 67, carrying belt mounting parts having through-holes; 68a and 68b, carrying belts; and 69, fasteners having hooks or magnetic tapes.

The loudspeaker units 60 and 60 are separably hinged to the body unit 50 through the assemblies of the hinge parts 53, 55 and 61, the hinge shafts 64 and the battery covers 66, respectively. These units 60, 60 and 50 are electrically connected to one another through the cords 62 extended from the loudspeaker units 60 and 60 through the hinges into the connector receiver chamber 57 where the connectors 63 are connected to the connector receivers 58.

The batteries 65 are inserted into each of the hollow cylindrical hinge shafts 64. Then, the hinge shaft 64 is fixed by being pushed against the protrusion on the inner surface of the respective hinge part 55 by the battery cover 66 which engages with the threads 54 cut in the hinge part 53. In this operation, one terminal of the battery 65 is electrically connected through the battery cover 66 to the thread 54 of the hinge part 53, while the other terminal is abutted against the protrusion on the inner surface of the hinge part 55, as a result of which the battery 65 is electrically connected to the power source terminals in the body unit 50. The fasteners 69 at the ends of the right and left belts 68a and 68b are secured at the mounting parts 67, after the belts are inserted into the through-holes in the mounting parts 67.

The right and left carrying belts of the cassette tape recorder described above can be tied around the user's belly like a champion's belt, or the cassette tape recorder can be hung from the shoulder with the carrying belts like a shoulder bag. Therefore, the user can carry the tape recorder with him without using his hands.

The loudspeaker units 60 are hinged to the body unit 50, the batteries 65 are inserted into the hinge shafts 64, and the cords 62, the connectors 63 and the connector receivers 58 which electrically connect the loudspeaker units 60 to the body unit 50 are all held in the body unit 50, as was described above. Therefore, when the cassette tape recorder is carried with the user, the cassette tape recorder is flexed according to the carrying condition. The width of the tape recorder is not so large, and no unnecessary protrusion are provided on the outside of the cassette tape recorder. Therefore, the carrying belts 68 can be smoothly tied around the user's belly, or the cassette tape recorder can be comfortably hung from the shoulder with the carrying belt. That is, the user can comfortably carry the cassette tape recorder with him at all times.

If the carrying belts 68 are removed from the tape recorder, then the latter can be used as a table cassette tape recorder. The right and left loudspeaker units 60 can be separated from the body unit by removing the battery covers 66. Therefore, if the loudspeaker units 60 thus separated are set suitably apart from each other, a greater stereophonic effect can be obtained.

Figure 9:
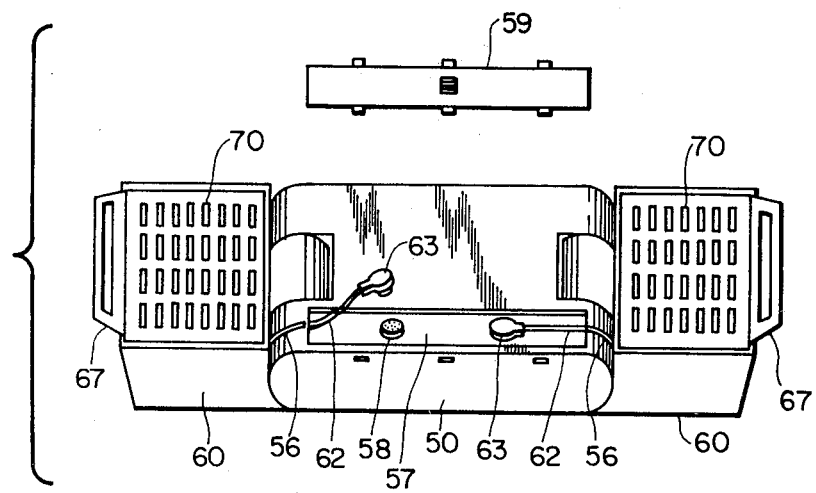
FIGS. 9 through 16 are diagrams showing modifications of the third example of the portable acoustic device according to the invention.

FIG. 9 shows an improvement of the rear surface of each loudspeaker unit 60 in FIG. 8. A plurality of throughholes 70 are cut in the rear surface of each loudspeaker unit, so that sound from the loudspeaker propagates through both surfaces of the loudspeaker unit and the user can listen to the stereophonic sound on both sides of the cassette tape recorder.

The flexible operation of the loudspeaker unit 60 with respect to the body unit 50 will be described with reference to FIGS. 10 and 11.

Figure 10A:
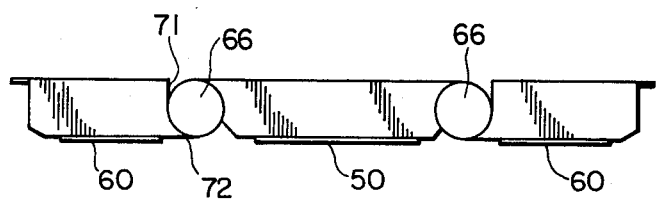
Figure 10B:
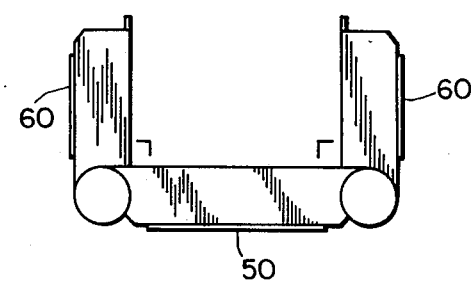
Figure 10C:
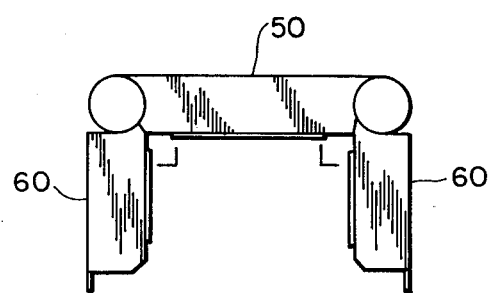

FIG. 10A is a top view of the cassette tape recorder shown in FIG. 9. The loudspeaker units 60 and 60 can be turned through about 90°, about the hinge shaft 64 incorporating the batteries, backwardly of the body unit 50 as shown in FIG. 10B and forwardly of the body unit 60 as shown in FIG. 10C. The angle of backward or forward rotation of each loudspeaker unit is limited by portions 71 and 72 when the loudspeaker unit 60 is turned to be in contact with the body unit 50.

Figure 11A:
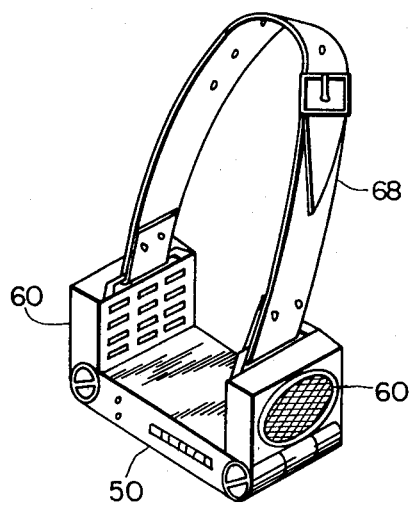
Figure 11B:
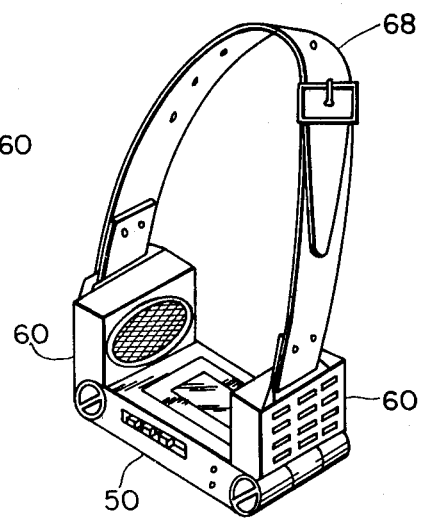

FIGS. 11A and 11B are external views of the tape recorder with the belts 68, which is bent as shown in FIGS. 10B and 10C, respectively. In this case, the tape recorder is formed into a shoulder cassette tape recorder which can be carried on the shoulder as shown in FIG. 11A or 11B.

Figure 12A:
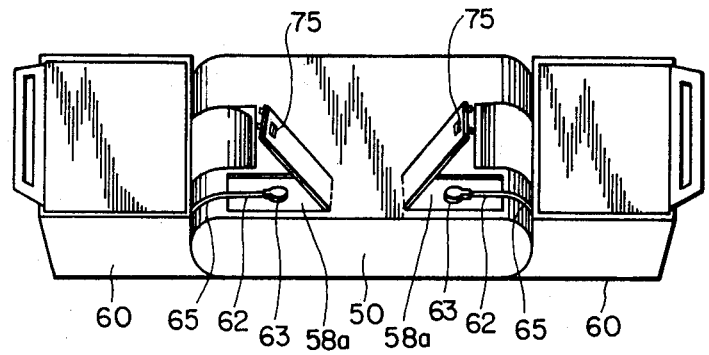
Figure 12B:
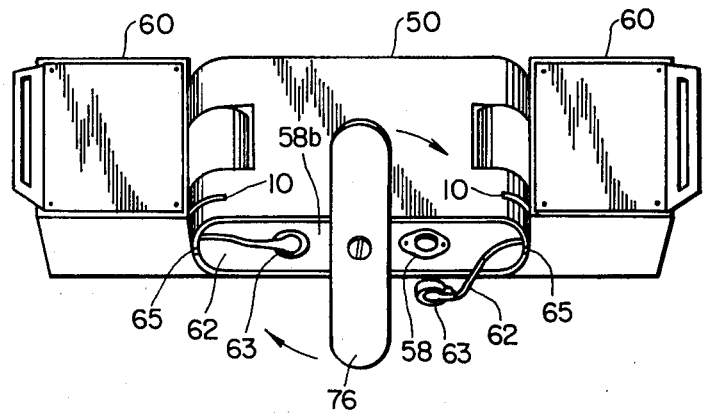
Figure 12C:
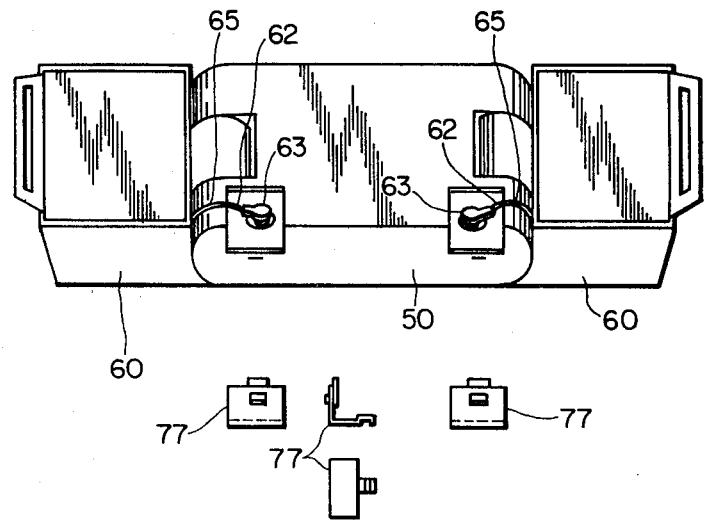

FIGS. 12A, 12B and 12C show modifications of the terminal chamber which is recessed in the audio signal generating section of the body unit, according to this invention. All of FIGS. 12A through 12C correspond to FIG. 9. In the modification shown in FIG. 12A, two terminal chambers are formed in the audio signal generating section similarly as in the case of FIG. 9, but instead of the cover 59, two doors 75 are provided to cover the two terminal chambers. In the modification shown in FIG. 12B, a terminal chamber is formed in the bottom of the body unit and a door 75 is rotatably provided for the terminal chamber. In the modification shown in FIG. 12C, two terminal chambers are formed over the rear and bottom surfaces of the body unit, and two sliding and/or snapping covers 77 are provided for the two terminal chambers, respectively.

Figure 13:
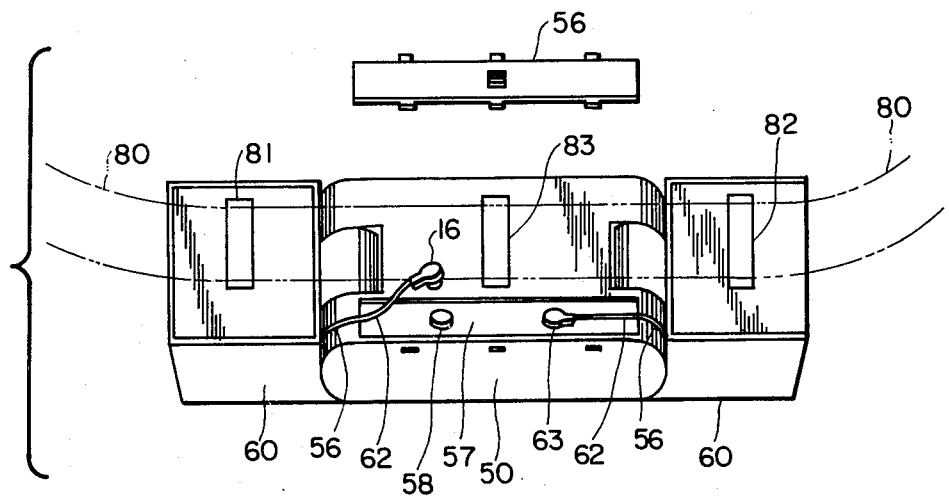

FIG. 13 shows one modification of the engagement of the belts with the body unit and the loudspeaker units shown in FIGS. 6 through 8. In this modification, the belts 68a and 68b are replaced by one long belt 80. Furthermore, instead of the belt mounting parts 67 and 67, belt mounting parts 81, 82 and 83 having through-holes into which the long belt is inserted are provided on the central portions of the rear surfaces of the loudspeaker units 60 and 60 and the body unit 50, respectively.

Figure 14:
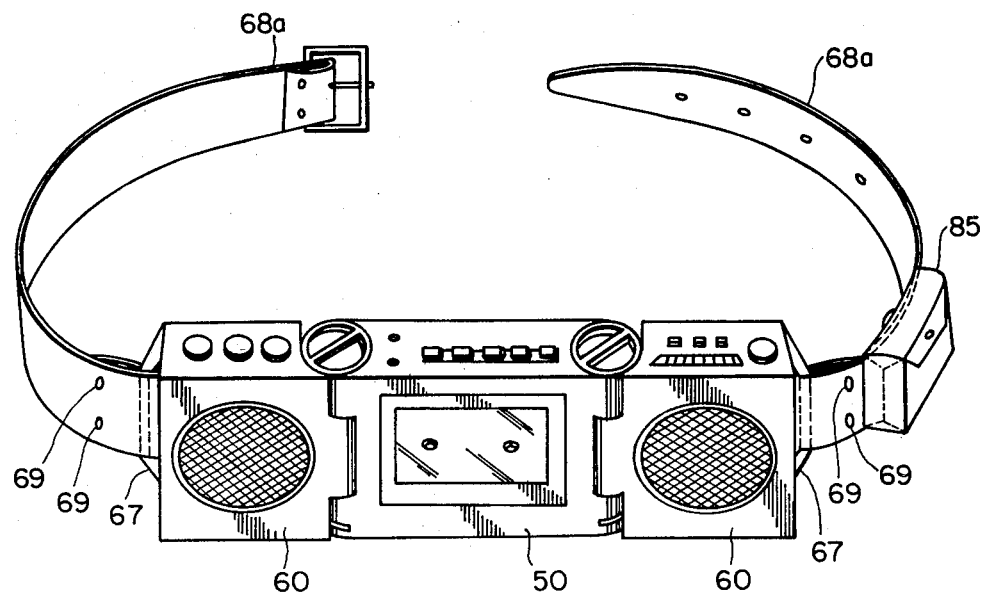

FIG. 14 shows a case 85 which can be used with the third example of the portable acoustic device shown in FIGS. 6 through 8. The case 85 is used for receiving or holding accessories such as for instance the microphone and the cassette tapes and spare items such as for instance spare batteries and spare cassette tapes. The case 85 is detachably mounted on the belt 68b.

Figure 15:
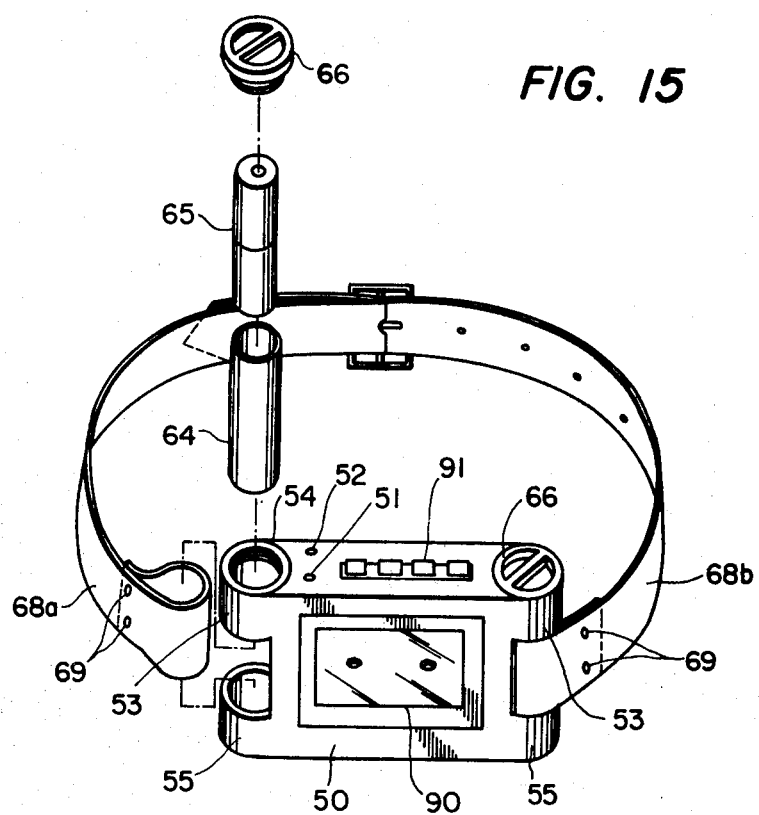

FIG. 15 shows one modification of the third example of the portable acoustic device shown in FIGS. 6 through 8. The loudspeaker units 60 and 60 are removed from the body unit 50, so that only the tape recorder remains, and this can then be listened to through the head-phones (not shown).

When the hinge shafts 64 are inserted into the hinge parts 53 and 55 of the body unit 50, there is a clearance between each hinge shaft 64 and the corresponding side of the body unit. Therefore, the end portions of the belts 68a and 68b can be fastened to the hinge shafts 64 with fasteners 69, after being inserted through the clearances. The carrying belts 68a and 68b can be tied around the user's belly, or the tape recorder can be hung from the shoulder with the belts. Therefore, the user can carry the tape recorder with him without using his hands.

In FIG. 15, reference numeral 90 designates a cassette drive section in the body unit 50; 91, cassette operating buttons.

Figure 16:
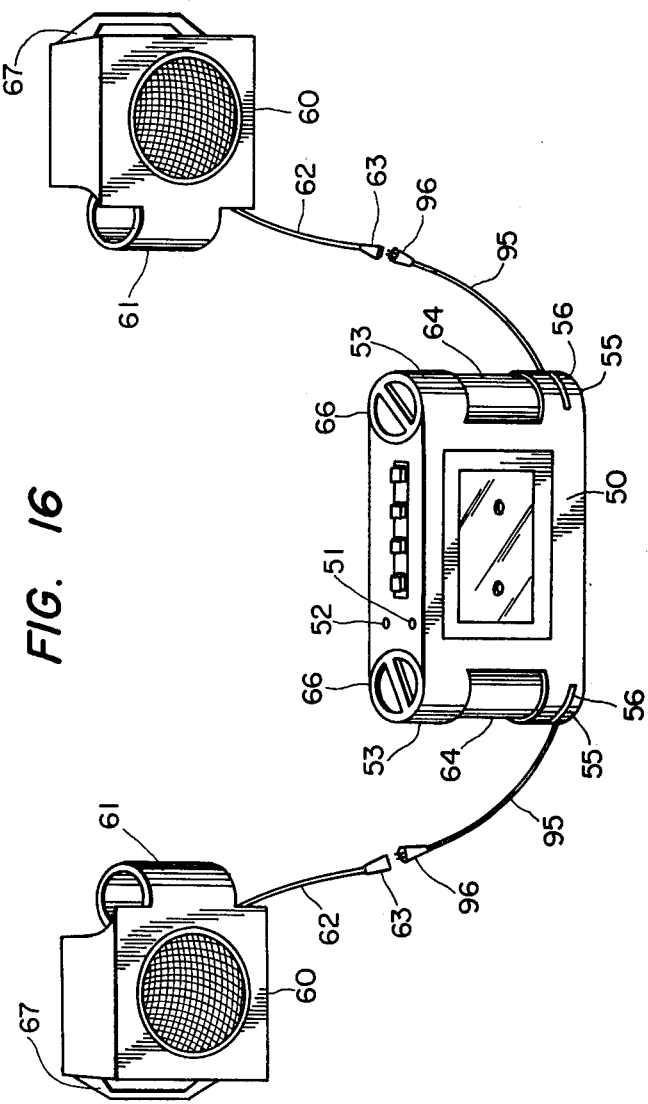

FIG. 16 shows another modification of the third example of the portable acoustic device shown in FIGS. 6 through 8. In this modification, the right and left loudspeaker units 60 and 60 are separated from the body unit 50, and these units 60 and 60 and 50 are electrically coupled through extension cords 95 with connector receivers 96. In FIG. 16, the radio sets are not shown. In this case, the right and left loudspeaker units 60 and 60 are connected to the body unit 50 through the cords 62 and the extension cords 95 with the connector receivers 96. Therefore, an excellent stereophonic reproduction effect can be obtained by suitably positioning the right and left loudspeaker units 60 and 60 on either side of the body unit 50.

What is claimed is:

1. A portable acoustic device in which sound recorded on a magnetic tape is reproduced through at least one loudspeaker, said device comprising:
    a body unit for generating signals corresponding to the sound recorded on a magnetic tape, said body unit having a first hollow hinge part with cylindrical inner walls and positioned on at least one side of said body unit;
    at least one loudspeaker unit receiving said signals for reproducing said recorded sound, said at least one loudspeaker unit having a second hollow hinge part thereon, said second hollow hinge part having cylindrical inner walls of substantially the same diameter as those of said first hollow hinge part;
    at least one cylindrical shaft passing through said first and second hollow hinge parts to thereby act as a hinge shaft about which said body unit and a least one loudspeaker unit are relatively rotatable, said shaft being of a form such that a battery can be fit therein;
    electrical signal connecting means between said body unit and said at least one loudspeaker unit; and
    electrical power connecting means between the interior of said shaft and said body unit.

2. A portable acoustic device as claimed in claim 1, wherein said body unit includes a first hollow hinge part on either side thereof, wherein said at least one loudspeaker unit comprises a pair of loudspeaker units on either side of said body unit, each loudspeaker unit having a second hollow hinge part thereon, and wherein said at least one hollow cylindrical shaft comprises two hollow cylindrical shafts passing through said first and second hollow hinge parts to rotatably couple said loudspeaker units to either side of said body unit.

3. A device as claimed in claim 2, in which at least one belt has one end fastened to one outer side of each loudspeaker unit.

4. A device as claimed in claim 3, in which said one outer side of each loudspeaker unit has a belt mounting part to which said belt is fastened.

5. A device as claimed in claim 4, in which said belt mounting part is an opening which is formed in said one outer side of each loudspeaker unit.

6. A device as claimed in claim 3, in which said at least one belt comprises first and second belts having first end portions fastened to respective ones of said two loudspeaker units, with the other end portion of each said belt having fastening means for fastening together said other end portions.

7. A device as claimed in claim 3, in which said at least one belt has fastener means by which said belt can be detachably fastened to at least one loudspeaker unit.

8. A device as claimed in claim 1, in which the height of said body unit is substantially an integral multiple of the height of one battery inserted in said hollow hinge shaft.

9. A device as claimed in claim 1, in which the operating buttons and knobs are arranged on the top surface of at least one of said body unit and said at least one loudspeaker unit.

10. A device as claimed in claim 1 or 2, in which a slit is formed in at least one of said first and second hollow hinge parts so that said body unit is electrically connected to each loudspeaker unit through said slit thus formed.

11. A device as claimed in claim 1 or 2, in which each loudspeaker unit coupled to said body unit is turnable forwardly and backwardly of said body unit.

12. A portable acoustic device in which sound recorded on a magnetic tape is reproduced through a loudspeaker comprising:
a body unit for generating signals corresponding to the sound recorded on a magnetic tape, said body unit having at least one first hollow hinge part with cylindrical inner walls and positioned on at least one side of said body unit;
electrical signal connecting means that is connected to said generated signal;
at least one loudspeaker unit having a loudspeaker connected to said electrical signal connecting means receiving said signals for reproducing said recorded sound, said at least one loudspeaker unit having a second hollow hinge part thereon, said second hollow hinge part having cylindrical inner walls of substantially the same diameter as those of said first hollow hinge part;
at least one hollow hinge shaft passing through said first and second hinge parts to mechanically couple said body unit and at least one loudspeaker unit for relative rotation, said hinge shaft being of a form such that a battery fits therewithin and being removable to separate said body unit and at least one loudspeaker unit for playing;
electrical power connecting means between the interior of said hinge shaft and said body unit;
at least one belt, one end of which is detachably connected to said at least one loudspeaker unit; and
means for connecting the other end of said belt to the side of the combination of body and loudspeaker units opposite the side of the other belt end.

13. A portable acoustic device as claimed in claim 12, wherein said body unit includes two first hollow hinge parts on both sides thereof, wherein said at least one loudspeaker unit comprises a pair of loudspeakers on both sides of said body unit and each having a second hollow hinge part, and wherein said at least one hinge shaft comprises two hinge shafts passing through said first and second hollow hinge parts to rotatably couple said loudspeakers to either side of said body unit.

14. A device as claimed in claim 13, in which said belt is fastened to a belt mounting part formed on the outer side of each loudspeaker unit.

15. A device as claimed in claim 13, in which the rear surface of each loudspeaker unit has a plurality of through-holes through which sound from a loudspeaker in each loudspeaker unit is propagated backwardly of each loudspeaker unit.

16. A device as claimed in claim 13, in which a portion of one of said first and second hollow hinge parts which are integral with said body unit and each loudspeaker unit, respectively, has a slit through which said body unit is electrically connected to each loudspeaker unit.

17. A device as claimed in claim 16, in which said body unit has a connector receiver, while each loudspeaker has a cord with a connector, and said body unit is electrically connected to each loudspeaker unit through said connector and said connector receiver.

18. A device as claimed in claim 17, in which said connector receiver is provided in a connector receiver chamber which is formed in the rear surface or bottom surface of each loudspeaker unit.

19. A device as claimed in claim 12 or 13, in which said at least one hinge shaft is a hollow shaft adapted to receive a battery or batteries.

20. A device as claimed in claim 12 or 13, in which the angle of rotation of said at least one loudspeaker unit with respect to said body unit is limited to a predetermined value.

21. A device as claimed in claim 20, in which said at least one loudspeaker unit is turnable with respect to said body unit through 90° both forwardly and backwardly of said body unit.

22. A device as claimed in claim 18, in which said connector receiver chamber has a cover which can be opened and closed as desired.

23. A device as claimed in claim 13, further comprising an extension cord for electrically connecting said body unit to each loudspeaker unit when said hinge shafts are removed and said body unit is separated from each loudspeaker unit.

24. A device as claimed in claim 13, further comprising a case for holding accessories and spare parts, said case being detachably secured to said belt.

25. A device as claimed in claim 13, wherein said body unit and loudspeaker units have belt mounting parts on rear surfaces thereof, and wherein said belt is fastened to said body unit and each of said loudspeaker units by passing through said belt mounting parts.

26. A device as claimed in claim 25, in which said hinge shafts are hollow hinge shafts adapted to receive batteries.

27. A cassette tape recorder in which sound recorded on a magnetic tape is reproduced, comprising:
(a) a body unit for generating signals corresponding to the sound recorded on a magnetic tape;
(b) first and second hollow hinge parts which are formed on either side of said body unit in such a manner that said first and second hollow hinge parts are spaced apart from each other;
(c) two cylindrical, hollow hinge shafts inserted into said first and second hollow hinge parts at each side, respectively, of said body unit, said cylindrical hollow hinge shaft adapted to receive a battery or batteries;
(d) belts fastened around respective ones of said cylindrical hollow hinge shafts; and
(e) a head-phone jack and operating buttons for operating a magnetic tape cassette, provided on the top surface of said body unit.

* * * * *